United States Patent
Purewal et al.

(10) Patent No.: US 10,960,995 B2
(45) Date of Patent: Mar. 30, 2021

(54) METHODS AND APPARATUSES FOR FILLING ADSORBENT POWDER IN A HYDROGEN OR NATURAL GAS TANK

(71) Applicant: Ford Global Technologies, LLC, Dearborn, MI (US)

(72) Inventors: Justin Purewal, Ann Arbor, MI (US); Michael J. Veenstra, Southgate, MI (US); Frank Rudowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/521,467

(22) Filed: Jul. 24, 2019

(65) Prior Publication Data
US 2021/0024231 A1    Jan. 28, 2021

(51) Int. Cl.
*B65B 1/24* (2006.01)
*B01D 53/04* (2006.01)
*F17C 11/00* (2006.01)
*B01J 20/22* (2006.01)

(52) U.S. Cl.
CPC .............. *B65B 1/24* (2013.01); *F17C 11/005* (2013.01); *B01D 53/04* (2013.01); *B01D 2253/204* (2013.01); *B01J 20/226* (2013.01)

(58) Field of Classification Search
CPC ..... B65B 1/24; B65B 1/20; B65B 1/26; F17C 11/005; B01D 53/04; B01D 2253/204; B01J 20/226; B30B 5/02
USPC ..................................... 141/12, 73; 100/211
See application file for complete search history.

(56) References Cited

U.S. PATENT DOCUMENTS

| | | | | |
|---|---|---|---|---|
| 3,137,898 A | * | 6/1964 | Geringer | B29D 22/00 425/389 |
| 3,610,563 A | * | 10/1971 | Allen | B29C 33/505 249/65 |
| 4,770,214 A | * | 9/1988 | Ginter | B65B 1/20 141/171 |
| 5,809,744 A | | 9/1998 | Villines et al. | |

(Continued)

FOREIGN PATENT DOCUMENTS

JP            4882295 B2  *  2/2012

OTHER PUBLICATIONS

JP-4882295-B2 English Translation of Specification (Year: 2020).*

(Continued)

*Primary Examiner* — Timothy P. Kelly
*Assistant Examiner* — Stephanie A Shrieves
(74) *Attorney, Agent, or Firm* — David B. Kelley; Brooks Kushman P.C.

(57) ABSTRACT

A method of filling a hydrogen-storage tank with a metal-organic framework (MOF) includes inserting MOF through an opening of the hydrogen-storage tank to at least partially fill an interior cavity of the tank with MOF. The method further includes positioning a compactor relative to the tank. The compactor includes a tamp configured to change shape between an insertion state in which the tamp is insertable through the opening and an expanded state in which the tamp is enlarged to be bigger than the opening. The method also includes inserting the tamp through the opening when the tamp is in the insertion state and switching the tamp from the insertion state to the expanded state. The method further includes compacting the MOF with the tamp.

19 Claims, 3 Drawing Sheets

(56) References Cited

U.S. PATENT DOCUMENTS

| | | | |
|---|---|---|---|
| 6,334,889 B1* | 1/2002 | Smolarek | B01D 53/0423 96/137 |
| 9,789,982 B2 | 10/2017 | Corniani et al. | |
| 9,834,326 B2 | 12/2017 | Wusatowska-Sarnek et al. | |
| 2011/0127174 A1* | 6/2011 | Heinrich | C01B 3/0005 206/0.7 |
| 2011/0160870 A1* | 6/2011 | Baumgartner | A61F 2/28 623/23.61 |
| 2016/0264121 A1* | 9/2016 | Dezen | B60V 1/15 |

OTHER PUBLICATIONS

Liu et al., "MOF-5 Composites Exhibiting Improved Thermal Conductivity", International Journal of Hydrogen Energy 37 (2012), pp. 6109-6117.

* cited by examiner

METHODS AND APPARATUSES FOR FILLING ADSORBENT POWDER IN A HYDROGEN OR NATURAL GAS TANK

TECHNICAL FIELD

This disclosure relates to methods and apparatuses for filling adsorbent powder in a hydrogen or natural gas tank and more specifically to compacting the adsorbent material inside of the tank to increase the amount of adsorbent in the tank.

BACKGROUND

The hydrogen fuel cell, and in particular the proton exchange membrane fuel cell (PEMFC), is a potential power source for future automobiles and stationary applications. The reaction in a PEMFC involves hydrogen molecules splitting into hydrogen ions and electrons at the anode, while protons re-combine with oxygen and electrons to form water and release heat at the cathode. Natural-gas engines are another technology being implemented in motor vehicles to reduce emissions. Both hydrogen-powered and natural-gas powered vehicles include on-board storage tanks for storing the fuel. Current technology for storing hydrogen or natural gas fuel on-board a vehicle is compressed gas. These on-board compressed-storage systems are bulky and expensive.

SUMMARY

According to one embodiment, a method of filling a hydrogen-storage tank with a metal-organic framework (MOF) includes inserting MOF through an opening of the hydrogen-storage tank to at least partially fill an interior cavity of the tank with MOF. The method further includes positioning a compactor relative to the tank. The compactor includes a tamp configured to change shape between an insertion state in which the tamp is insertable through the opening and an expanded state in which the tamp is enlarged to be bigger than the opening. The method also includes inserting the tamp through the opening when the tamp is in the insertion state and switching the tamp from the insertion state to the expanded state. The method further includes compacting the MOF with the tamp.

According to another embodiment, a compactor for compacting a metal-organic framework (MOF) in a hydrogen-storage tank includes a body defining a passageway configured to received pressurized air. A tamp of the compactor includes an air bladder attached to the body and in fluid communication with the passageway. The air bladder has a deflated state in which the tamp is insertable through an opening of the hydrogen-storage tank and an inflated state in which the tamp occupies a volume of the tank to compact the MOF.

According to yet another embodiment, a method of filling a hydrogen-storage tank with a metal-organic framework (MOF) includes inserting MOF into an interior of a hydrogen-storage tank, inserting a deflated air bladder into the interior, and inflating the air bladder to compact the MOF in the tank.

DETAILED DESCRIPTION

Figure 1:
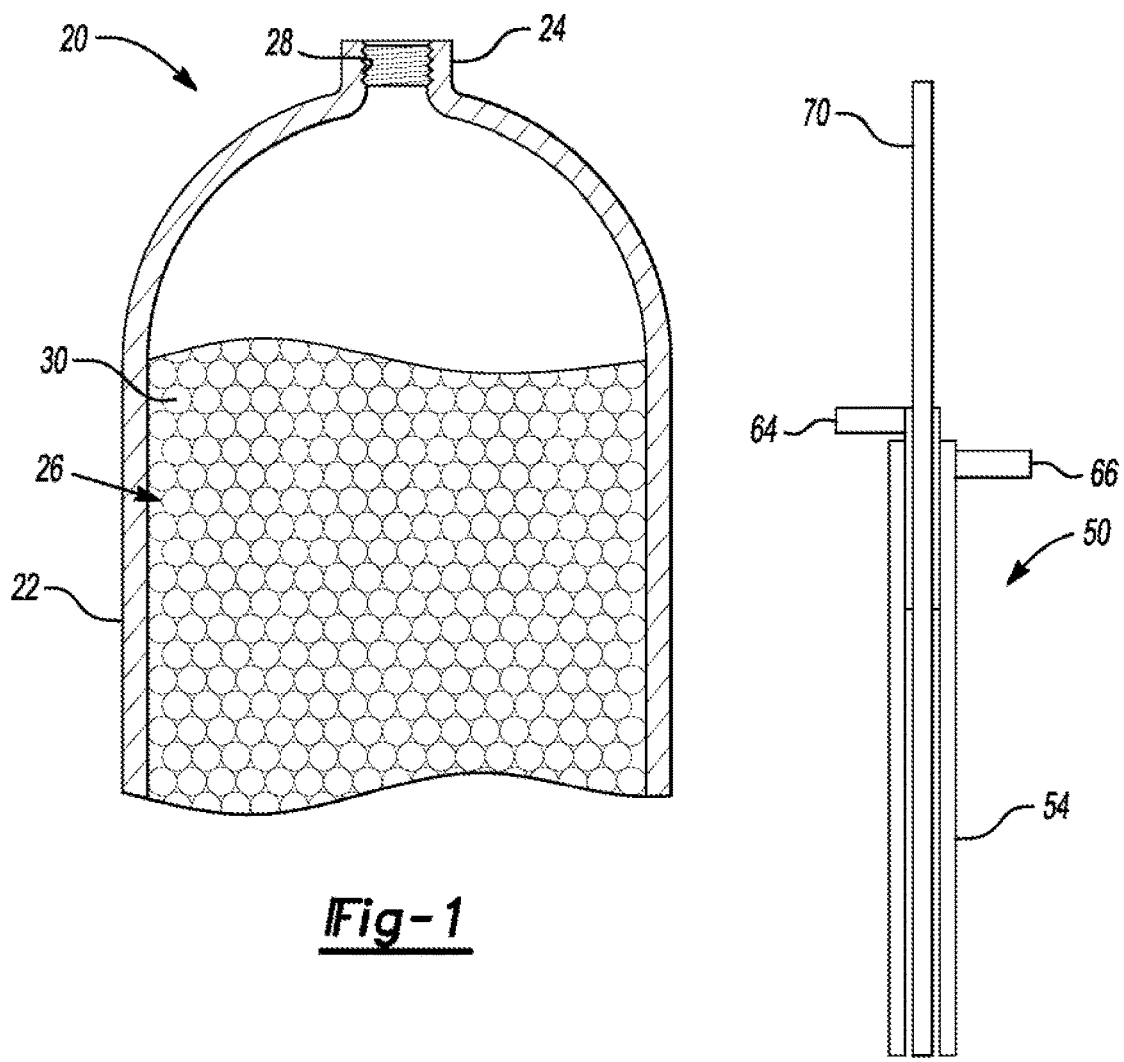
FIG. 1 is a diagrammatical view of a storage tank filled with adsorbent powder.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

PEMFC are a popular fuel cell choice for automotive vehicles. The PEMFC generally includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode catalytic mixture, the cathode catalytic mixture and the PEM define a membrane electrode assembly (MEA). In order to facilitate the transport of reactant gases to and remove the excessive water and heat from the catalytic mixture, a gas diffusion layer (GDL), which may include a microporous layer and a carbon fiber based gas diffusion backing layer, is applied on either side of the MEA. GDLs also provide mechanical support for the soft goods including the PEM and catalytic mixtures.

MEAs are sandwiched between bipolar plates to form individual fuel cells. The bipolar plates typically include an anode side and a cathode side. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. Coolant channels may be disposed between the anode and cathode sides of the bipolar plates to provide heat transfer functionality to the fuel cell.

Several fuel cells are typically combined in a fuel cell stack to generate the desired power. For example, the stack may include two-hundred or more fuel cells arranged in series. The fuel cell stack receives a cathode reacting gas, typically a flow of air forced through the stack by a compressor. Not all the oxygen is consumed by the stack and some of the air is output as a cathode exhaust gas that may include water as a stack byproduct. The fuel cell stack also receives an anode hydrogen reacting gas that flows into the anode side of the stack.

The fuel cell is powered by hydrogen that is stored in one or more hydrogen-storage tanks. The capacity of a hydrogen tank may be increased with the addition of high surface area adsorbents such as activated carbon or metal organic framework (MOF) inside the interior of the tank. MOFs are a class of synthetic porous materials that store hydrogen at the molecular level. Many types of MOF are known, and this disclosure is not limited to any particular form, but, in one example, MOF-5 is used. MOFs have a very high number of pores and surface area which allow higher hydrogen uptake in a given volume than an empty void space, i.e., a tank filled with MOF can hold more hydrogen than an empty tank at the same pressure and temperature conditions.

Vehicle may also be powered by engines that use natural gas as fuel. The storing of natural gas has many of the same difficulties as storing hydrogen. The storage capacity of a natural-gas storage tank can also be increased by providing an adsorbent in the tank. Adsorbents include MOF and activated carbon.

Referring to FIG. 1, an example tank 20, such as a hydrogen or natural-gas storage tank, includes a main portion 22 and at least one neck portion 24. The main portion 22 defines a cavity (interior) 26 for storing fuel. The one or more neck portions 24 each defines an opening 28 communicating with the cavity 26 so that contents can pass into and/or out of the cavity 26. The tank is filled with adsorbent 30 (e.g., MOF) to a desired level. The adsorbent 30 may be processed into a powder so that it can be added into the tank 20 via the opening 28. Simply adding the powder to the cavity 26 results in low density due to air voids between the individual adsorbents particles. Compacting the adsorbents powder results in a higher density and increases the storage capacity of the tank 20. Compacting the adsorbent powder outside the tank results in pellets that leave large voids when added to the tank and compacting directly in the tank is difficult due to the diameter of the opening 28 compared to the diameter of the cavity 26. The following text and drawings describe methods and apparatuses for mechanically compacting adsorbents powder within a hydrogen-storage tank or a natural-gas storage tank without the need to modify the tank itself. Compacting the MOF may also increase the thermal conductivity.

Storage tanks typically include only the small opening in the neck for ingress/egress of the cavity in order to manage the stress in the pressure vessel. This small opening makes it difficult to insert a tool for compacting the MOF. Modifying the tank so that it has a larger opening or is formed of multiple, connectable components has other drawbacks such as reduced structural integrity. Thus, what is needed is a compactor capable of being inserted into the small opening and expanded, once inside the tank, to compact the adsorbent such as MOF. According to one embodiment, a compactor for compacting adsorbent in a storage tank includes a body and a tamp for compacting the adsorbent. The tamp has a first state (fit position) in which the tamp can be inserted into the cavity via the opening and a second state (second position) in which the tamp is expanded forming a usable tool for compacting the adsorbent. The adsorbent may be compacted by applying a uniaxial load (e.g., in a length direction of the tank) to move the tamp towards the bottom of the tank. The tamp may be operated in a single stroke or may be reciprocated back and forth several times until a desired level of compaction is achieved.

Figure 2:
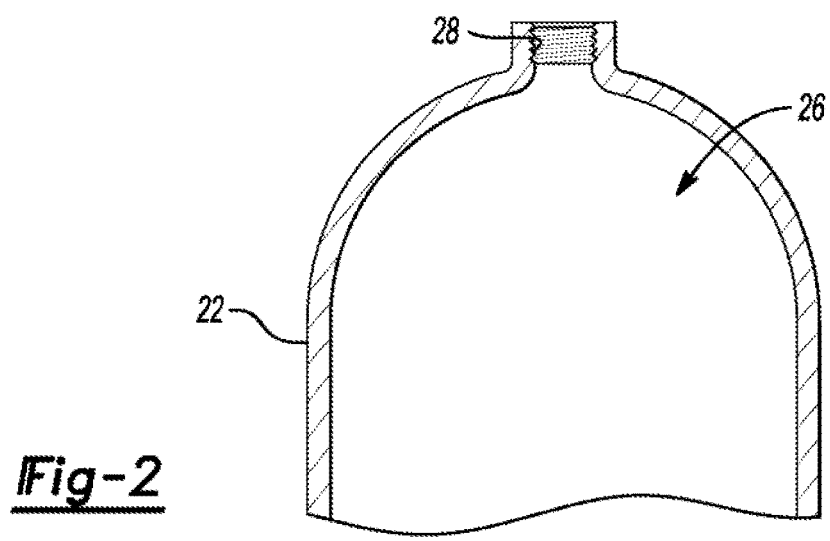
FIG. 2 is a diagrammatical view of a compactor in an insertion state and positioned to be installed in a storage tank.
Figure 3:
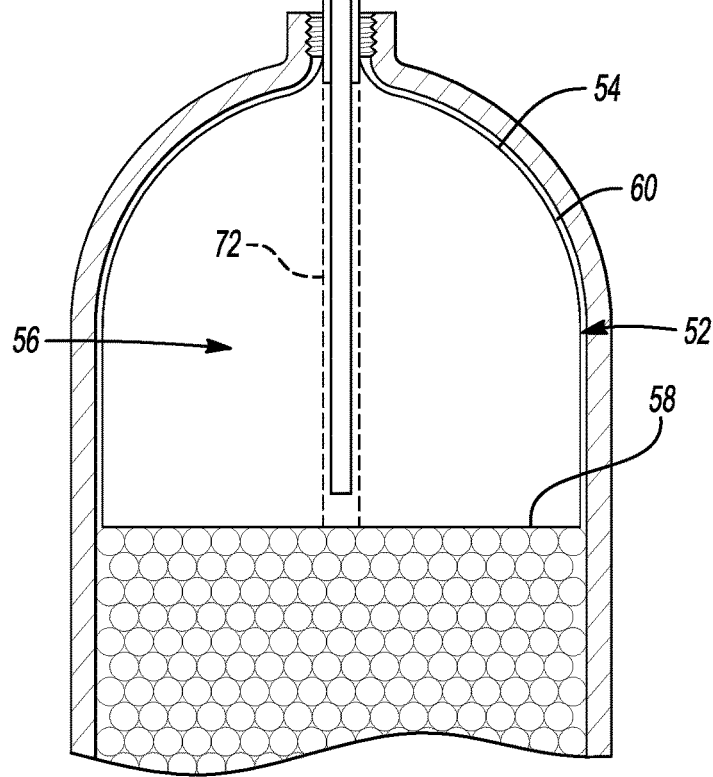
FIG. 3 is a diagrammatical view of a compactor installed in a storage tank and in an expanded state.

Referring to FIGS. 2 and 3, a compactor 50 is configured to compact adsorbent within the storage tank 20. A compactor 50 includes an insertion state (FIG. 2) in which the compactor is capable of being inserted through the opening 28 and an expanded state (FIG. 3) in which a tamp 52 is formed inside of the tank. The tamp 52 may include an air bladder 54 that is inflated in the expanded state and is deflated an insertion state. The air bladder 54 may be formed of one or more panels of material connected such that an air cavity 56 is formed. The panels may include a bottom panel 58 and one or more side panels 60. The bottom panel 58 may be circular and have a diameter that substantially matches the diameter of the cavity 26. The one or more side panels 60 may be shaped to generally conform with the shape of the cavity 26 as shown in FIG. 3. In other embodiments, the air bladder may not conform with the shape of the cavity.

The air bladder 54 is attached to a body 62 which may be elongated and cylindrical in shape. The body 62 is designed to at least partially extend into the opening 28. The body 62 includes an air-line input fitting 64 that is in fluid communication with the air cavity 56 via one or more passageways defined in the body. (See FIG. 4). During operation, air is supplied to the compactor 50 via the input fitting 64 and subsequently fills the air cavity 56 to inflate the bladder 54. The body 62 may also include a vent 66 for deflating the air bladder 54. The vent 66 is connected in fluid communication with the air cavity 56 via one or more passageways defined in the body. (See FIG. 4).

In some embodiments, a compactor 50 is capable of filling the tank 22 with adsorbent while the compactor 50 is installed on the tank. The compactor 50 may into include a fill tube 70 that may extend through the body 62 and the air bladder 54. The air bladder 54 may define a hollow center 72 through which the fill tube 70 extends. Adding the fill tube 70, in cooperation with the design of the air bladder 54, allows the tank 22 to be filled with adsorbent in multiple stages (commonly referred to as lifts). For example, the tank 22 may be filled to a first level with adsorbent then compacted, filled to a second level then compacted, and filled to third level then compacted without having to remove the compactor 50 from the opening 28. The air bladder 54 may be deflated when the adsorbent is being added as will be described in more detail below. In other embodiments, the compactor 50 may not include filling components, in which case, the compactor 50 is removed to add additional adsorbent.

Figure 4:
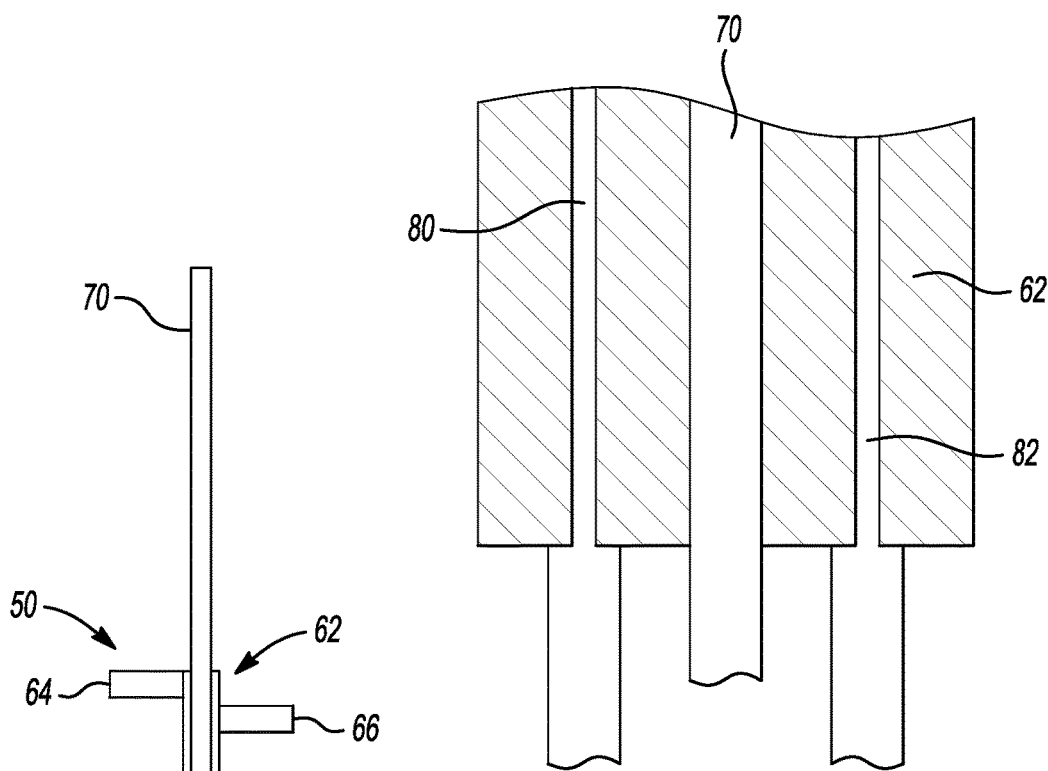
FIG. 4 is a diagrammatical view, in cross section, of a portion of the compactor.

FIG. 4 illustrates a zoomed in cross-sectional view of the body 62 to show the internal passageways. The air-line input fitting 64 is connected to the air cavity 56 via one or more passageways 80. The vent 66 is connected to the air cavity 56 via one or more passageways 82.

In another embodiment, the tamp may be formed of a reinforced shape-memory polymer, which is a material that becomes elastic when heated above a transition temperature and rigid when cooled below the transition temperature. The shape-memory tamp includes an insertion state in which the tamp is heated using an electrical heater to narrow the material enough to fit through the tank opening. Once inserted, the tamp is cooled and is formed into a piston shape by allowing the elastic material to form against the interior walls of the tank. The shape of the piston is designed to effectively compact the powder within the tank. The adsorbent powder may be poured into the tank either prior to the insertion of the shape-memory polymer or through an opening in the tamp or through another tank opening. The loose powder may then be mechanically compacted using the tamp. For example, the tamp may be reciprocated up-anddown to compact the powder. Once suitable compaction is achieved, the tamp is reheated to shrink back to its insertion state and is then removed.

The following figures and text describe example methods for filling and compacting MOF in hydrogen-storage tanks using a compactor. The compactor may be the same or similar to any of the above described compactors or any other type of compactor capable of preforming the below-described methods. The method steps, while described in a particular order, are not limited any particular order disclosed herein. Additionally, steps may be added or omitted without departing from the scope and spirit of this disclosure. While the steps are described as being discrete, one or more of the steps may occur simultaneously and be effectuated by a common action.

Figure 5:
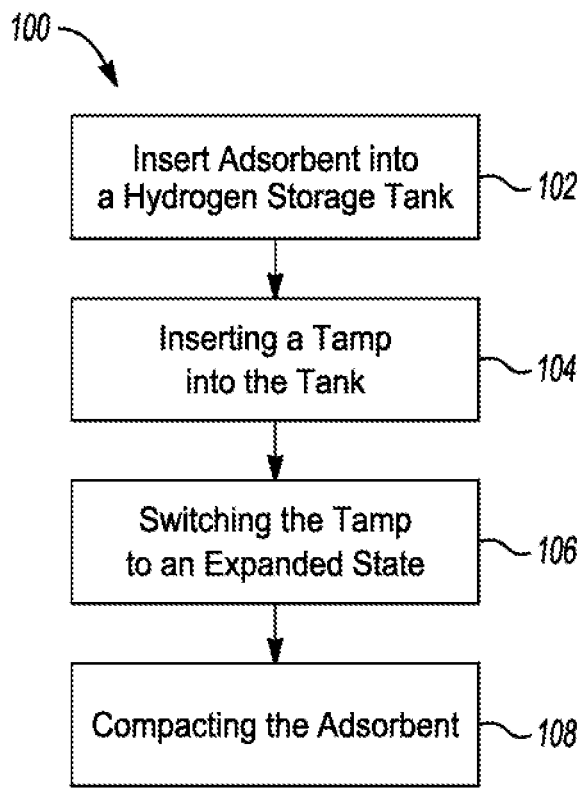
FIG. 5 is a flow chart showing a method for filling a storage tank with adsorbent powder.

Referring to FIG. 5, a method 100 of filling a storage tank includes inserting adsorbent into a tank at step 102. The adsorbent may be filled by pouring powdered adsorbent through the opening of the tank. At step 104, a tamp of a compactor is installed in the tank. To install the tamp, the tamp is in the insertion position so that the tamp can fit through the small opening of the tank. Once in the insertion position, the tamp may be inserted into the opening as a diameter of the tamp in the insertion position is smaller than the diameter of the opening. Steps 102 and 104 may be switched in other embodiments as long as the compactor includes a filling tube or similar feature that allows adsorbent to be added to the tank when the tamp is installed.

After installing the tamp into the opening, the tamp is switched to an expanded state at step 106. Depending upon the type of tamp employed, the tamp may be switched to the expanded state by inflating an air bladder or modifying a shape-memory polymer described above. At step 108, the tamp compacts the adsorbent powder. In some embodiments, such as the air bladder embodiments, steps 106 and 108 may occur simultaneously as the air bladder compacts the adsorbent as it inflates. In other embodiments, compaction occurs via movement of the tamp. For example, compacting the adsorbent further includes moving the tamp away from the opening in a single movement to compress the adsorbent, or tamp may be reciprocated multiple times until adequate compaction occurs.

In some embodiments, the adsorbent may be added and compacted in lifts in which case the method 100 is repeated until a desired amount of adsorbent is installed within the tank. If a fill tube is included in the compactor, there is no need to remove it from the tank when adding additional adsorbent. Here, the tamp may be switched to the insertion position, e.g. deflating the air bladder, when adsorbent is added to allow sufficient space within the cavity of the tank. (In the shape-memory embodiment, the tamp may remain in the expanded state and is simply retracted to create space for the additional adsorbent, or may be switched to the insertion position.) Once a sufficient amount of additional adsorbent is installed within the tank, the tamp is used to compact the additional adsorbent. This may include inflating an air bladder or mechanical movement of the tamp. Once the desired amount of adsorbent is installed and compacted within the tank, the tamp is switched to the insertion position and subsequently removed.

Figure 6:
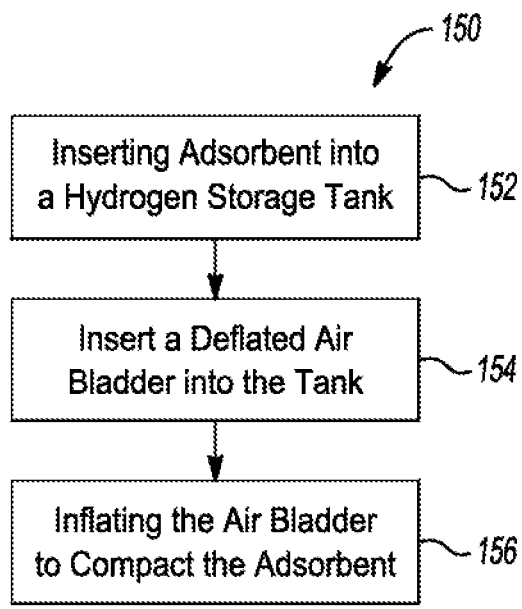
FIG. 6 is a flow chart showing another method for filling a storage tank with adsorbent powder.

Referring to FIG. 6, a method 150 of filling a storage tank with an air-bladder compactor will now be described. At step 152, adsorbent is inserted into an interior cavity of a tank. At step 154, a deflated air bladder (i.e., a tamp) is installed into the opening of the tank. When deflated, the air bladder is smaller than the opening allowing it to be inserted. (Steps 152 and 154 may be switched in some embodiments.) Once inserted, the air bladder is inflated to compact the adsorbent within the tank at step 156. The air bladder is inflated by supplying pressurized air to the compactor. The amount of compaction may be varied by increasing or decreasing the amount of inflation of the air bladder to control the volume and/or internal pressure of the air bladder in order to achieve a desired level of compaction. The amount of compaction may also be controlled by modifying this physical size of the air bladder. Once the adsorbent is compacted, the air bladder may be deflated so that it will fit through the opening and subsequently removed from the tank.

In some embodiments, the adsorbent may be added and compacted in lifts using a compactor having a fill tube so that the compactor need not be removed from the tank in order to add additional adsorbent. Here, the air bladder may be deflated when the additional adsorbent is added and re-inflated to compact the additional adsorbent. The steps may be repeated for a desired number of lifts.

In other embodiments, the compactor may need to be removed in order to add additional adsorbent. Here, the bladder is deflated and removed from the tank following a first compaction step. Once the bladder is removed, additional adsorbent is added into the tank. The bladder, while deflated, is reinstalled into the opening of the tank and subsequently inflated to compact the additional adsorbent. Once sufficient compaction is achieved, the bladder is again deflated and removed from the tank. The steps may be repeated as desired.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A compactor for compacting a metal-organic framework (MOF) in a hydrogen-storage tank, the compactor comprising:
   a body defining a passageway configured to receive pressurized air;
   a tamp including an air bladder attached to the body and in fluid communication with the passageway, the air bladder including a deflated state in which the tamp is insertable through an opening of the hydrogen-storage tank and an inflated state in which the tamp occupies a volume of the tank to compact the MOF; and
   an MOF fill tube, wherein the fill tube is circumscribed by the air bladder.

2. The compactor of claim 1, wherein the air bladder defines a hole and the fill tube extends through the hole.

3. The compactor of claim 1, wherein the air bladder includes a disk-shaped panel.

4. The compactor of claim 1 further comprising an air-release valve in fluid communication with the air bladder.

5. The compactor of claim 1, wherein the body defines a vent passageway in fluid communication with the air bladder.

6. The compactor of claim 5 further comprising an air-release valve in fluid communication with the vent passageway.

7. The compactor of claim 5, wherein the vent passageway is a plurality of vent passageways.

8. A compactor for compacting a metal-organic framework (MOF) in a hydrogen-storage tank, the compactor comprising:
 a body defining a passageway configured to receive pressurized air;
 a tamp including an air bladder attached to the body and in fluid communication with the passageway, the air bladder including a deflated state in which the tamp is insertable through an opening of the hydrogen-storage tank and an inflated state in which the tamp occupies a volume of the tank to compact the MOF;
 an MOF fill tube, wherein the fill tube extends through the body.

9. The compactor of claim 8, wherein the air bladder defines a hole and the fill tube extends through the hole.

10. The compactor of claim 8, wherein the air bladder includes a disk-shaped panel.

11. The compactor of claim 8 further comprising an air-release valve in fluid communication with the air bladder.

12. The compactor of claim 8, wherein the body defines a vent passageway in fluid communication with the air bladder.

13. The compactor of claim 12 further comprising an air-release valve in fluid communication with the vent passageway.

14. The compactor of claim 12, wherein the vent passageway is a plurality of vent passageways.

15. A method of filling a hydrogen-storage tank with a metal-organic framework (MOF), the method comprising:
 inserting MOF into an interior of a hydrogen-storage tank;
 inserting a deflated air bladder into the interior;
 inflating the air bladder to compact the MOF in the tank;
 deflating the air bladder;
 inserting additional MOF into the interior, wherein the additional MOF is inserted while the air bladder is disposed in the tank; and
 inflating the air bladder to compact the additional MOF in the tank.

16. The method of claim 15 further comprising:
 removing the deflated air bladder from the interior.

17. The method of claim 15, wherein inserting the MOF includes flowing the MOF through a fill tube.

18. The method of claim 17, wherein the fill tube is circumscribed by the bladder.

19. The method of claim 17, wherein the fill tube extends through the bladder.

* * * * *